United States Patent
Kanevsky et al.

(10) Patent No.: US 7,360,248 B1
(45) Date of Patent: Apr. 15, 2008

(54) METHODS AND APPARATUS FOR VERIFYING THE IDENTITY OF A USER REQUESTING ACCESS USING LOCATION INFORMATION

(75) Inventors: Dimitri Kanevsky, Ossining, NY (US); Stephane Herman Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,352

(22) Filed: Nov. 9, 1999

(51) Int. Cl.
 *G06F 21/00* (2006.01)
(52) U.S. Cl. ....................................................... 726/21
(58) Field of Classification Search ................ 713/182; 380/258, 247; 726/21
 See application file for complete search history.

(56) References Cited

U.S. PATENT DOCUMENTS

| 5,757,916 A | * | 5/1998 | MacDoran et al. | ......... 380/258 |
| 5,897,616 A | | 4/1999 | Kanevsky et al. | |
| 5,953,700 A | | 9/1999 | Kanevsky et al. | |

OTHER PUBLICATIONS

"FCC Requires Cellular Companies to Locate, Complete 911 calls," Jun. 13, 1996, downloaded from http://centralohio.thesource.net/Files3/9606135.html.

Meyer et al., "Wireless Enhanced 9-1-1 Service—Making it a Reality," Bell Labs Technical Journal, pp. 188-202 (Autumn 1996).
"News You Can Use," Jun. 22, 1998, downloaded from http://www.usnews.com/usnews/issue/980622/22cell.htm.
"Personal Alarm Locator System (PALS)," downloaded from http://www.com.vt.edu/projects/dominion on Jan. 12, 2001.
"Cat & Mouse," downloaded from http://www.ecst.csuchico.edu/~ian/cnm.html on Jan. 12, 2001.
Bluetooth FAQ—Products, downloaded from http://www.bluetooth.com/bluetoothguide/faq/4.asp on Jan. 12, 2001.
Bluetooth FAQ—Technology, downloaded from http://www.bluetooth.com/bluetoothguide/faq/2.asp on Jan. 12, 2001.

\* cited by examiner

*Primary Examiner*—Kambiz Zand
*Assistant Examiner*—Andrew L Nalven
(74) *Attorney, Agent, or Firm*—Ryan, Mason & Lewis, LLP

(57) ABSTRACT

A global positioning system (GPS)-based access control method and apparatus are disclosed for limiting access to a device or secure facility by verifying the location of an authorized user. The GPS-based access control system confirms that the user requesting access to a device or secure location is physically present at the location of the device or secure location. Upon an access control request, the location of the user is obtained using an individual GPS system carried by each user on a portable device, such as a pocket token, computer-readable card, cellular telephone or watch. If the location of a person making an access control request does not coincide with the coordinates of the individual GPS that is being worn by the authorized user associated with the password, then the person requesting access is unauthorized.

58 Claims, 3 Drawing Sheets

*FIG. 2*

| AUTHORIZED USER DATABASE | | |
|---|---|---|
| USER 240 | PASSWORD 245 | GPS IDENTIFIER 250 |
| | | |
| | | |
| | | |
| | | |

METHODS AND APPARATUS FOR VERIFYING THE IDENTITY OF A USER REQUESTING ACCESS USING LOCATION INFORMATION

FIELD OF THE INVENTION

The present invention relates generally to access control techniques, and more particularly, to a method and apparatus for restricting access to a particular device or secure facility.

BACKGROUND OF THE INVENTION

Computers and other devices, as well as secure facilities, often contain proprietary and/or sensitive information, which could be compromised if accessed by unauthorized individuals. Thus, computer devices and secure facilities often incorporate security techniques, such as database access control mechanisms, to prevent unauthorized users from accessing, obtaining or altering the proprietary and/or sensitive information. Authentication techniques allow users to prove their identity and obtain authorized access to a given device or secure facility.

A number of authentication protocols have been developed to prevent the unauthorized access of such devices or locations. For example, access control mechanisms typically utilize some variation of an alphanumeric personal identification number (PIN) or password, that is presumably known only to the authorized user. Upon attempting to access a given device or physical location, the user enters the appropriate password, to establish his or her authority. Many users select a PIN or password that is easy to remember. Thus, there is a significant risk that such passwords may be guessed or otherwise compromised, in which case an attacker can access the given device or location.

To minimize the risk that a password will be compromised, the number of login attempts that may be attempted are often limited, so that an attacker cannot keep trying different passwords until successful. In addition, users are often encouraged or required to change their password periodically. One-time passwords have also been proposed to further increase security, where users are assigned a secret key that may be stored, for example, on a pocket token or a computer-readable card. Upon attempting to access a desired device or location, a random value, referred to as a "challenge," is issued to the user. The pocket token or computer-readable card then generates a "response" to the challenge by encrypting the received challenge with the user's secret key. The user obtains access to the device or location provided the response is accurate. In order to ensure that the pocket token or computer-readable card is utilized by the associated authorized user, the user typically must also manually enter a secret alphanumeric PIN or password.

In further variations, access control mechanisms have secured access to devices or secure locations by evaluating biometric information, such as fingerprints, retinal scans or voice characteristics. For a more detailed discussion of one such biometric-based access control system, see, for example, U.S. Pat. No. 5,897,616, entitled "Apparatus and Methods for Speaker Verification/Identification/Classification Employing Non-Acoustic and/or Acoustic Models and Databases," U.S. patent application Ser. No. 09/008,122, filed Jan. 16, 1998, entitled "A Portable Information and Transaction Processing System and Method Utilizing Biometric Authorization and Digital Certificate Security," and U.S. patent application Ser. No. 09/417,645, filed Oct. 14, 1999, entitled "Point of Sale and Vending Service Payment via Portable Communication Device", each assigned to the assignee of the present invention and incorporated by reference herein.

While such authentication tools reduce the unauthorized access of equipment or a secure facility, they suffer from a number of limitations, which if overcome, could dramatically increase the utility and effectiveness of such tools. For example, there is currently no mechanism to ensure that a person associated with a given password is physically present at the location where the password is utilized. A need therefore exists for an access control mechanism that uses the global positioning system to verify the location of a person who is requesting access to a secured device or location.

SUMMARY OF THE INVENTION

Generally, a location-based access control method and apparatus are disclosed for limiting access to a device or secure facility by verifying the location of an authorized user. According to one aspect of the invention, a GPS-based access control system confirms that the user requesting access to a device or secure location is physically present at the location of the device or secure location. In further variations, the location of the user is confirmed using, for example, triangulation techniques or techniques used to implement the enhanced cellular 911 system. In the illustrative embodiment, the location of the user is obtained from an individual GPS system carried by each user on a portable device, such as a pocket token, computer-readable card, cellular telephone or watch.

The GPS system utilizes a satellite network to identify the exact location of objects using radio signals received from the object. The individual GPS is used to obtain the physical location of the authorized user at the time of an access control request. If the location of a person making an access control request does not coincide with the coordinates of the individual GPS that is being worn by the authorized user, then the person requesting access is unauthorized.

Each device or secure location includes a GPS-based access control system that issues a challenge to the user, upon an attempt to access the device or location, to establish the user's authority. For example, the challenge may include a request for a password, a request for a pocket token or a computer-readable card, or a request for biometric information, such as fingerprints, retinal scans or voice characteristics. The GPS-based access control system queries the central GPS system to identify the physical location of the authorized user who is registered with the entered password. The central GPS system communicates with the individual GPS system associated with the authorized user who is registered with the entered password, pocket token, computer-readable card or biometric information, to determine the location. The central GPS system transmits the location coordinates to the GPS-based access control system central server. The measured location of the authorized user is compared with the known location of the device for which access has been requested. If the coordinates corresponding to the measured location of the authorized user do not match the coordinates of the device for which access has been requested, then the access request is rejected.

A more complete understanding of the present invention, as well as further features and advantages of the present invention, will be obtained by reference to the following detailed description and drawings.

BRIEF DESCRIPTION OF THE DRAWINGS

FIG. 2 is a sample table from the authorized user database of FIG. 1; and

DETAILED DESCRIPTION OF PREFERRED EMBODIMENTS

Figure 1:
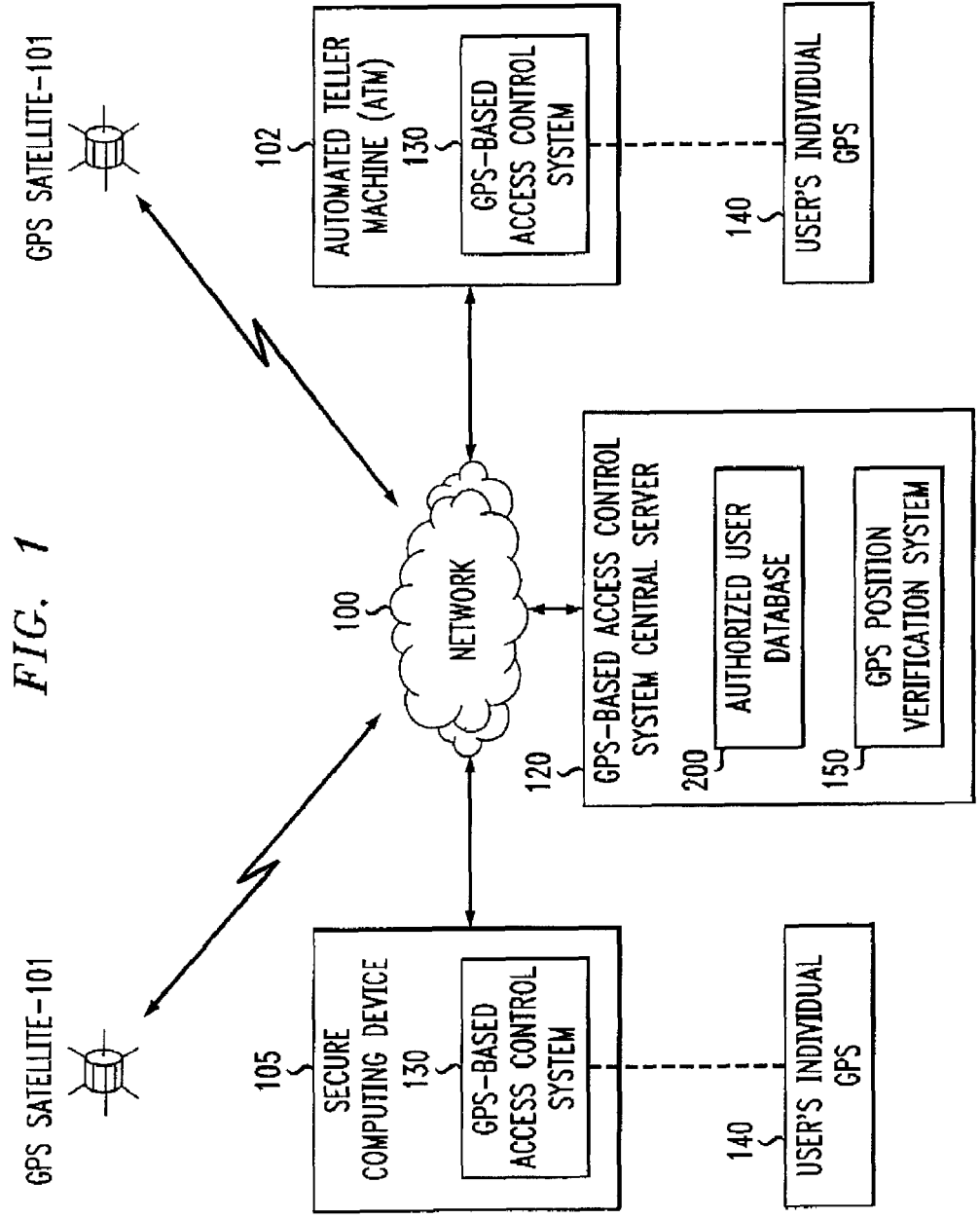
FIG. 1 illustrates a network environment in which an illustrative global positioning system (GPS)-based access control system in accordance with the present invention may operate.

FIG. 1 illustrates a network environment 100 in which the present invention can operate. As shown in FIG. 1, a global positioning system (GPS)-based access control system 130 restricts access to devices 102, 105 that are connected to the network 100. According to a feature of the present invention, the GPS-based access control system 130 confirms that the user requesting access to the device or secure location is physically present at the location of the device or secure location. The location of the user is obtained from an individual GPS system 140 carried by each user on a portable device, such as a pocket token, computer-readable card, cellular telephone or watch. GPS watches are commercially available, for example, from Casio Computer Company Ltd. of Tokyo, Japan. While the present invention is illustrated herein using a GPS system to determine the location of a user, any well-known technique can be used, including those mentioned herein, as would be apparent to a person of ordinary skill.

According to a feature of the invention, the GPS system is utilized to verify the identity of a user requesting access to a given device or secure location, by ensuring that the person is physically present at the location of the given device or secure location. The GPS system utilizes a satellite network to identify the exact location of objects using radio signals received from the object, in a known manner. Each authorized user has an associated individual GPS 140. The present invention provides a new security measure that uses an individual GPS 140 to obtain the physical location of the authorized user at the time of an access control request. If the location of a person making an access control request does not coincide with the coordinates of the individual GPS 140 that is being worn by the authorized user, then the person requesting access is unauthorized. In other words, if the individual GPS 140 associated with the authorized user is not at the location of the device 102, 105 that is being accessed, then access is denied.

In further variations, the location of the user can be confirmed using, for example, triangulation techniques or techniques used to implement the enhanced cellular 911 system. For a detailed discussion of enhanced 911 cellular service (EC911), see Meyer et al., "Wireless Enhanced 9-1-1 Service—Making It A Reality," Bell Labs Technical Journal, 188-202 (Autumn 1996), incorporated by reference herein. For a general discussion of various systems and techniques for detecting the location of a user using a transmitter, see, for example, http://www.cwt.vt.edu/projects/dominion; http://www.ecst.csuchico.edu/~ian/cnm.html; "News You Can Use," http://www.usnews.com/usnews/issue/980622/22cell.htm (Jun. 22, 1998), http://centralohio.thesource.net/Files3/9606135.html (Jun. 13, 1996) and Bluetooth, http://www.bluetooth.com/v2/default.asp, each incorporated by reference herein. In yet another variation, the location of the person requesting access to a particular device or facility, can be asked questions about the location of the device or facility. The response can be processed by a speech recognition system to validate the identity of the user, and the accuracy of the response can be used to confirm that the user is physically present at the device or facility. See, for example, U.S. Pat. No. 5,897,616, entitled "Apparatus and Methods for Speaker Verification/Identification/Classification Employing Non-acoustic And/or Acoustic Models and Databases."

For example, the identity of a user can be obtained or verified by requiring the user to place a telephone call to the access control system 130 from a predefined cellular telephone. Voice recognition technology can be used to identify or verify the identity of the user, and the enhanced cellular 911 technology can be utilized to confirm that the user requesting access to the device or secure location is physically present at the location of the device or secure location. Well-known caller identification ("caller id") techniques can be used to confirm that the user requesting access is using the appropriate cellular telephone. For a more detailed discussion of speaker identification techniques and the use of caller identification techniques to confirm that the user requesting access is using the appropriate cellular telephone application, see, for example, U.S. Pat. No. 5,897,616, entitled "Apparatus and Methods for Speaker Verification/Identification/Classification Employing Non-Acoustic and/or Acoustic Models and Databases," U.S. patent application Ser. No. 08/788,471, filed Jan. 28, 1997, entitled "Text Independent Speaker Recognition For Transparent Command Ambiguity Resolution and Continuous Access Control," U.S. patent application Ser. No. 08/787,029, filed Jan. 28, 1997, entitled "Speaker Model Prefetching," and U.S. patent application Ser. No. 08/851,982, filed May 6, 1997, entitled "Speaker Recognition Over Large Population with Fast and Detailed Matches," each assigned to the assignee of the present invention and incorporated by reference herein.

As shown in FIG. 1, the device for which the user is requesting access may be, for example, an automated teller machine (ATM) 102, a computing device 105 or an access control mechanism (not shown), such as a card-reader, that restricts access to a secure location. Each device 102, 105 includes a GPS-based access control system 130 that issues a challenge to the user, upon an attempt to access the device 102, 105, to establish the user's authority. For example, the challenge may include a request for a password, a request for a pocket token or a computer-readable card, or a request for biometric information, such as fingerprints, retinal scans or voice characteristics. In addition, according to a feature of the present invention, the GPS-based access control system 130 queries the central GPS system located on satellites 101 to identify the physical location of the authorized user who is registered with the entered password or other response to the issued challenge. The central GPS system 101 communicates with the individual GPS system 140 associated with the authorized user who is registered with the entered password. The central GPS system can identify the exact location of the authorized user in a well-known manner.

The central GPS system transmits the location coordinates to the GPS-based access control system central server 120 using the network 100. The GPS-based access control system central server 120 then uses a GPS position verification system 300, discussed below in conjunction with FIG. 3, to compare the measured location of the authorized user with the known location of the device 102, 105 for which access has been requested. It is noted that the location of the device 102, 105 can be fixed and pre-recorded for each device, or may be obtained in real-time by associating an individual GPS 140 with the device 102, 105 and by using the central GPS system to verify the location of the device 102, 105 each time access is requested. If the coordinates corresponding to the measured location of the authorized user do not match the coordinates of the device 102, 105 for which access has been requested, then the access request is rejected.

In further variations, additional security measures can be obtained by implementing a local verification system for the individual GPS 140 associated with each user, to ensure that the individual GPS 140 is utilized only by the associated authorized user. For a discussion of a system and method that perform local biometric authorization on a device, see, for example, U.S. Pat. No. 5,953,700, entitled "Portable Acoustic Interface for Remote Access to Automatic Speech/Speaker Recognition Server," and U.S. patent application Ser. No. 09/008,122, filed Jan. 16, 1998, entitled "A Portable Information and Transaction Processing System and Method Utilizing Biometric Authorization and Digital Certificate Security," each assigned to the assignee of the present invention and incorporated by reference herein.

For example, a local verification system for the individual GPS 140 can require the user to periodically enter a password or can be based on biometrics captured using sensors. In this manner, the possibility of unauthorized access to a device 102, 105 as the result of a lost or stolen individual GPS 140 is reduced. For a discussion of a suitable local verification system for the individual GPS 140, see, for example, U.S. patent application Ser. No. 09/008,122, filed Jan. 16, 1998, entitled "A Portable Information and Transaction Processing System and Method Utilizing Biometric Authorization and Digital Certificate Security," and U.S. patent application Ser. No. 09/079,754, filed May 15, 1998, entitled "Apparatus and Method for User Recognition Employing Behavioral Passwords," each assigned to the assignee of the present invention and incorporated by reference herein.

FIG. 2 illustrates an exemplary authorized user database 200 that stores information on each authorized user of the GPS-based access control system 120. The exemplary authorized user database 200 maintains a plurality of records, each associated with a different user. For each user listed in field 240, the authorized user database 200 indicates the current password in field 245 and identifies the individual GPS 140 associated with the user in field 250. In this manner, upon an attempt to access a secure device or location, the GPS identifier in field 250 can be used to obtain the current location of the authorized user.

Figure 3:
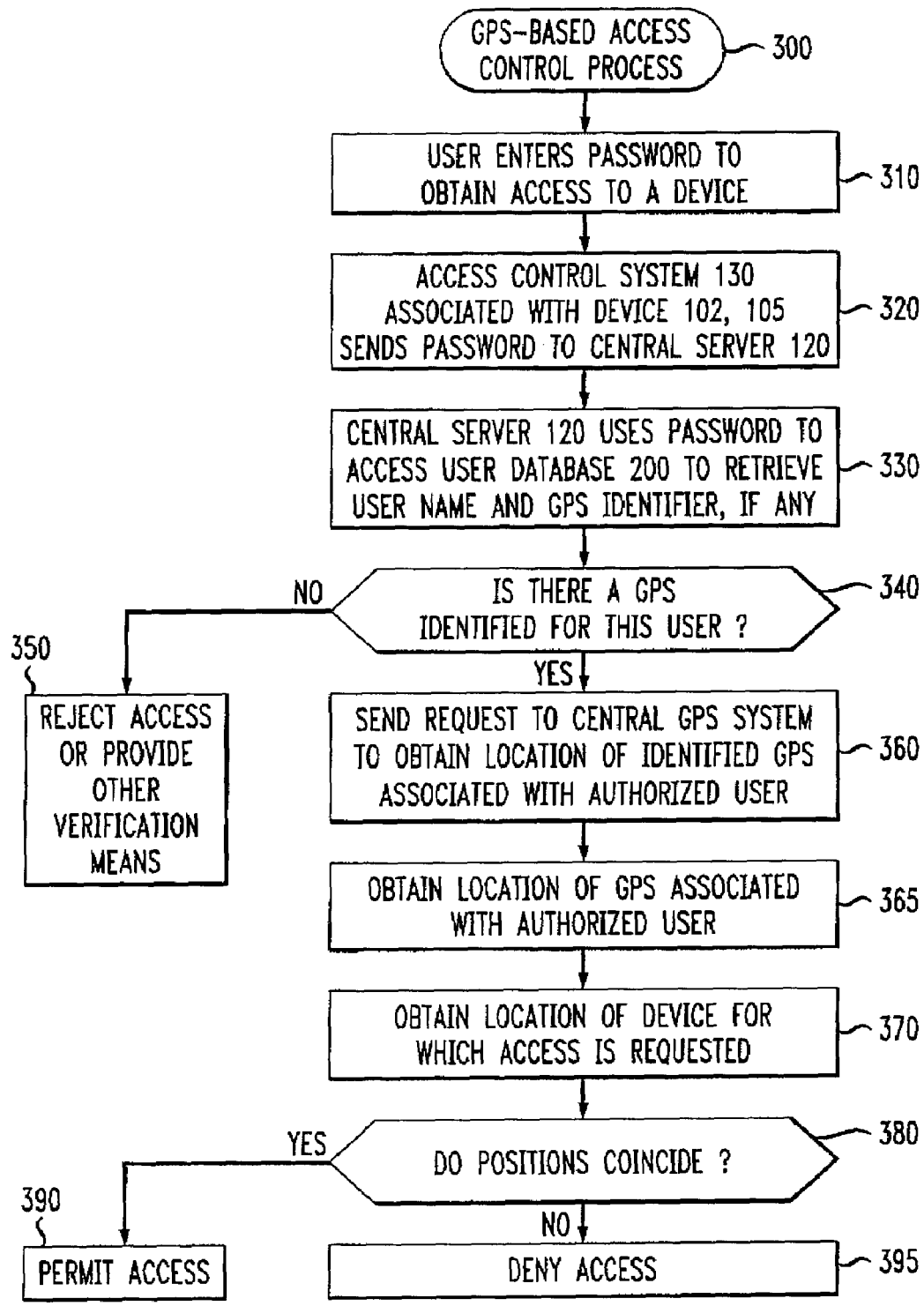
FIG. 3 is a flow chart describing an exemplary GPS-based access control process incorporating features of the present invention.

FIG. 3 is a flow chart describing an exemplary GPS-based access control process 300 incorporating features of the present invention. As shown in FIG. 3, the GPS-based access control process 300 is initiated during step 310 upon the user's entry of a password to request access to a device 102, 105. The access control system 130 associated with the device transmits the password to the access control system central server 120 during step 320. Thereafter, the central server 120 uses the received password to access the authorized user database 200 during step 330 and to retrieve the user name and GPS identifier, if any, associated with the password.

A test is performed during step 340 to determine if there is a GPS identified in the appropriate record of the authorized user database 200 for this user. If it is determined during step 340 that a GPS is not identified in the appropriate record of the authorized user database 200 for this user, then access is denied or other verification means are provided during step 350. If, however, it is determined during step 340 that a GPS is identified in the appropriate record of the authorized user database 200 for this user, then a request is sent to the central GPS system 101 during step 360 to determine the location of the individual GPS 140 that is identified for the authorized user (and presumably being worn by the authorized user). The identified location is received from the central GPS system 101 during step 365. In addition, the location of the device 102, 105 for which access has been requested is obtained during step 370.

A test is performed during step 380 to determine if the two positions obtained during steps 365 and 370 coincide. If it is determined during step 380 that the two positions do coincide, then access is granted during step 390. If, however, it is determined during step 380 that the two positions do not coincide, then access is denied during step 395.

According to another feature of the present invention, the location of the authorized user can be used to reduce the population of interest in evaluating biometric information. For example, all of the users within a predefined distance of the device 102, 105 from which access is being requested can be determined. In addition, biometric information is obtained about the requestor. Thereafter, biometric identification is performed to extract the individual from among the set of users who are "near" the device 102, 105.

In an alternate implementation, biometric identification can be performed over the entire population of potential users. The biometric identification system provides a list of potential names for the user requesting access. The list of top N best matches is then evaluated to determine if any of the users on the list are physically present at the location of the requested device 102, 105. Thus, the identified user must both (i) be listed on the top N list, and (ii) be physically "near" the location of the requested device 102, 105.

It is noted that the present invention is particularly useful for implementing the system described in U.S. patent application Ser. No. 09/417,645, filed Oct. 14, 1999, entitled "Point of Sale and Vending Service Payment via Portable Communication Device", assigned to the assignee of the present invention and incorporated by reference above.

It is to be understood that the embodiments and variations shown and described herein are merely illustrative of the principles of this invention and that various modifications may be implemented by those skilled in the art without departing from the scope and spirit of the invention.

What is claimed is:

1. A method for verifying the identity of a user, said method comprising the steps of:
   issuing a challenge to said user;
   receiving a response to said challenge from said user;
   identifying a first location of an authorized person associated with said response, wherein said first location is identified by utilizing a portable device assigned to said user;
   identifying a second location where said response is received, wherein said second location is identified by utilizing location information associated with a requested resource at said second location; and
   providing access to said user if said first and second locations substantially match.

2. The method of claim 1, wherein said response is a password.

3. The method of claim 1, wherein said response is a pocket token.

4. The method of claim 1, wherein said response is a computer-readable card.

5. The method of claim 1, wherein said response is biometric information.

6. The method of claim 1, wherein said first location of an authorized person is obtained using an individual global positioning system.

7. The method of claim 6, wherein said individual global positioning system includes a local verification system.

8. The method of claim 6, wherein said individual global positioning system is included in a portable device carried by said authorized user.

9. The method of claim 1, wherein said second location where said response is received is obtained from an individual global positioning system associated with a requested device or facility.

10. The method of claim 1, wherein said second location where said response is received is obtained from recorded information associated with a requested device or facility.

11. The method of claim 1, wherein said first location of an authorized person is obtained using a triangulation technique.

12. The method of claim 1, wherein said first location of an authorized person is obtained using enhanced cellular 911 techniques.

13. The method of claim 1, wherein said first location of an authorized person is obtained by identifying the location of a transmitting device associated with said authorized person.

14. The method of claim 1, wherein said first location of an authorized person is confirmed by querying said user about something at the location of a requested device or facility.

15. The method of claim 14, further comprising the step of identifying said user by applying speaker recognition techniques to an answer to said query.

16. A method for verifying the identity of a user, said method comprising the steps of:
receiving a response to a challenge from said user;
identifying a first location of an authorized person associated with said response, wherein said first location is identified by utilizing a portable device assigned to said authorized person;
identifying a second location where said response is received, wherein said second location is identified by utilizing location information associated with a requested resource at said second location; and
providing access to said user if said first and second locations substantially match.

17. The method of claim 16, wherein said first location of an authorized person is obtained using an individual global positioning system.

18. The method of claim 17, wherein said individual global positioning system includes a local verification system.

19. The method of claim 17, wherein said individual global positioning system is included in a portable device carried by said authorized user.

20. The method of claim 16, wherein said second location where said response is received is obtained from an individual global positioning system associated with a requested device or facility.

21. The method of claim 16, wherein said second location where said response is received is obtained from recorded information associated with a requested device or facility.

22. The method of claim 16, wherein said first location of an authorized person is obtained using a triangulation technique.

23. The method of claim 16, wherein said first location of an authorized person is obtained using enhanced cellular 911 techniques.

24. The method of claim 16, wherein said first location of an authorized person is obtained by identifying the location of a transmitting device associated with said authorized person.

25. The method of claim 16, wherein said first location of an authorized person is confirmed by querying said user about something at the location of a requested device or facility.

26. The method of claim 25, further comprising the step of identifying said user by applying speaker recognition techniques to an answer to said query.

27. A system for verifying the identity of a user, comprising:
a memory that stores computer readable code; and
a processor operatively coupled to said memory, said processor configured to:
receive a response to a challenge from said user;
identify a first location of an authorized person associated with said password, wherein said first location is identified by utilizing a portable device assigned to said authorized person;
identify a second location of where said response is received, wherein said second location is identified by utilizing location information associated with a requested resource at said second location; and
provide access to said user if said first and second locations substantially match.

28. The system of claim 27, wherein said first location of an authorized person is obtained using an individual global positioning system.

29. The system of claim 28, wherein said individual global positioning system includes a local verification system.

30. The system of claim 28, wherein said individual global positioning system is included in a portable device carried by said authorized user.

31. The system of claim 27, wherein said second location where said response is received is obtained from an individual global positioning system associated with a requested device or facility.

32. The system of claim 27, wherein said second location where said response is received is obtained from recorded information associated with a requested device or facility.

33. The system of claim 27, wherein said first location of an authorized person is obtained using a triangulation technique.

34. The system of claim 27, wherein said first location of an authorized person is obtained using enhanced cellular 911 techniques.

35. The system of claim 27, wherein said first location of an authorized person is obtained by identifying the location of a transmitting device associated with said authorized person.

36. The system of claim 27, wherein said first location of an authorized person is confirmed by querying said user about something at the location of a requested device or facility.

37. The system of claim 36, wherein said processor is further configured to identify said user by applying a speaker recognition technique to an answer to said query.

38. An article of manufacture for verifying the identity of a user, comprising:
a computer readable medium having computer readable code means embodied thereon, said computer readable program code means comprising:
a step to receive a response to a challenge from said user;
a step to identify a first location of an authorized person associated with said response, wherein said first location is identified by utilizing a portable device assigned to said authorized person;
a step to identify a second location where said response is received, wherein said second location is identified by utilizing location information associated with a requested resource at said second location; and
a step to provide access to said user if said first and second locations substantially match.

39. A method for identifying a user requesting access to a device, said method comprising the steps of:
receiving biometric information from said user;
identifying each registered person within a predefined distance of said requested device, wherein said identification is performed by utilizing a portable device assigned to each registered person and wherein a location of said requested device is identified by utilizing location information associated with said requested device; and
identifying said user from among said identified persons using said biometric information.

40. The method of claim 39, wherein said step of identifying each registered person within a predefined distance of said requested device further comprises the step of identifying individual global positioning systems associated with registered persons within said predefined distance.

41. The method of claim 39, wherein said step of identifying each registered person within a predefined distance of said requested device further comprises the step of identifying transmitting devices associated with registered persons within said predefined distance.

42. A method for identifying a user requesting access, said method comprising the steps of:
receiving biometric information from said user;
identifying a list of potential users based on said biometric information; and
identifying said user by comparing a location of each identified potential users with a location where said biometric information was obtained, wherein said location of each identified potential user is obtained by utilizing a portable device assigned to each identified potential user and wherein said location where said biometric information was obtained is identified by utilizing location information associated with a requested resource at said location where said biometric information was obtained.

43. The method of claim 42, wherein said location of each identified potential user is obtained by identifying the location of an individual global positioning system associated with each of said identified potential users.

44. The method of claim 42, wherein said location of each identified potential user is obtained by identifying the location of a transmitting device associated with each of said identified potential users.

45. A method for identifying of a user requesting access to a device, said method comprising the steps of:
receiving a communication from a transmitting device assigned to said user;
identifying said user using a voice recognition system; and
confirming said user requesting access to said device is physically present at the location of said requested device by determining a location of said transmitting device, wherein said location of said requested device is identified by utilizing location information associated with said requested device.

46. The method of claim 45, wherein said transmitting device is a cellular telephone.

47. The method of claim 46, further comprising the step of confirming that said user is using a cellular telephone associated with said user using caller identification techniques.

48. The method of claim 47, wherein confirming step further comprises the step of determining the location of said cellular telephone using enhanced cellular 911 techniques.

49. A system for identifying a user requesting access to a device, comprising:
a memory that stores computer readable code; and
a processor operatively coupled to said memory, said processor configured to:
receive biometric information from said user;
identify each registered person within a predefined distance of said requested device, wherein said identification is performed by utilizing a portable device assigned to each registered person and wherein a location of said requested device is identified by utilizing location information associated with said requested device; and
identify said user from among said identified persons using said biometric information.

50. The system of claim 49, wherein said registered persons within a predefined distance of said requested device further are identified by identifying individual global positioning systems associated with registered persons within said predefined distance.

51. The system of claim 49, wherein said registered person within a predefined distance of said requested device are identified by identifying transmitting devices associated with registered persons within said predefined distance.

52. A system for identifying a user requesting access, comprising:
a memory that stores computer readable code; and
a processor operatively coupled to said memory, said processor configured to:
receive biometric information from said user;
identify a list of potential users based on said biometric information; and
identify said user by comparing a location of each identified potential users with a location where said biometric information was obtained, wherein said location of each identified potential user is obtained by utilizing a portable device assigned to each identified potential user and wherein said location where said biometric information was obtained is identified by utilizing location information associated with a requested resource at said location where said biometric information was obtained.

53. The system of claim 52, wherein said location of each identified potential user is obtained by identifying the location of an individual global positioning system associated with each of said identified potential users.

54. The system of claim 52, wherein said location of each identified potential user is obtained by identifying the location of a transmitting device associated with each of said identified potential users.

55. A system for identifying of a user requesting access to a device, comprising:
- a memory that stores computer readable code; and
- a processor operatively coupled to said memory, said processor configured to:
- receive a communication from a transmitting device assigned to said user;
- identify said user using a voice recognition system; and
- confirm said user requesting access to said device is physically present at the location of said requested device by determining a location of said transmitting device, wherein said location of said requested device is identified by Utilizing location information associated with said requested device.

56. The system of claim 55, wherein said transmitting device is a cellular telephone.

57. The system of claim 56, wherein said processor is further configured to confirm that said user is using a cellular telephone associated with said user using caller identification techniques.

58. The system of claim 57, wherein said processor is further configured to determine the location of said cellular telephone using enhanced cellular 911 techniques.

* * * * *